United States Patent Office 3,415,793
Patented Dec. 10, 1968

3,415,793
FILM FORMING POLYCARBONAMIDES FROM HEXACHLOROBICYCLOHEPTENYL CARBOCYCLIC AROMATIC DIACIDS
Emil F. Jason and Ellis K. Fields, Chicago, Ill., assignors to Standard Oil Company, Chicago, Ill., a corporation of Indiana
No Drawing. Application July 13, 1962, Ser. No. 209,747, now Patent No. 3,318,933, dated May 9, 1967, which is a continuation-in-part of application Ser. No. 795,891, Feb. 27, 1959. Divided and this application Dec. 13, 1965, Ser. No. 525,790
2 Claims. (Cl. 260—78)

ABSTRACT OF THE DISCLOSURE

Film forming carbonamides of hexachlorobicycloheptenyl carbocyclic aromatic acids having less than 3 aromatic rings and having 1 aromatic ring atom joined to hexachlorobicycloheptenyl radical prepared by reacting diamines with the hexachlorobicycloheptenyl carbocyclic aromatic acids.

---

This is a division of Ser. No. 209,747, filed July 13, 1962, now U.S. Patent 3,318,933, granted May 9, 1967 which is a continuation-in-part of Ser. No. 795,891, filed Feb. 27, 1959, now abandoned.

This invention relates to a novel group of halogen-containing aromatic organic compounds. It especially relates to novel hexachlorobicycloheptenyl-substituted aromatic acids and derivatives thereof, and to their utilization in the preparation of insecticidal, herbicidal and fungicidal compositions; improved resinous compositions and lubricants.

Specifically, this invention provides novel and useful mono- and di-cyclic aromatic acids having one ring carbon atom joined to a hexachlorobicycloheptenyl radical. The invention further provides useful and valuable derivatives of these acids including the anhydrides, acid halides, esters, salts, amides and polyamides thereof. The invention still further provides useful compositions containing these novel aromatic acids and derivatives.

The novel acids of the present invention are mono- or polybasic aromatic acids which may be represented by the following structural formula:

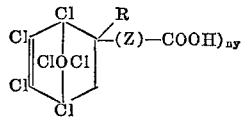

wherein R is selected from the group consisting of high and low molecular weight alkyl radicals, Z is an aromatic nucleus having less than three aromatic rings, such as a benzene, biphenyl or a naphthalene nucleus, and $n$ is an integer from 1 to 4, usually 1 to 3, inclusive, and $y$ is an integer from 1 to 2, inclusive, corresponding to the number of aromatic rings in Z. Strictly speaking, the expression "bicycloheptenyl radical" should refer to the structural formula depicted above wherein R is hydrogen, but for simplicity, the expression will be employed in the specification and claims to denote the radical attached to the ring carbon atom of the aromatic acid wherein R is either hydrogen or a low molecular weight alkyl radical having 1 to 4 carbon atoms, generally a methyl or ethyl radical. It will be clear from the structural formula that these novel compositions are derivatives of hexachloronorbornene.

The present invention provides the hexachlorobicycloheptenyl aromatic acids and their derivatives including their anhydrides, acid halides, esters, salts, amides, and polyamides. The novel compounds, especially the free acids and salts thereof are particularly useful in the preparation of insecticidal, herbicidal, and fungicidal compositions. They exhibit high toxic action against many common insects.

The derivatives of the novel hexachlorobicycloheptenyl substituted aromatic acids, especially the esters and amides, are useful as plasticizers for organic resinous compositions such as vinyl chloride, and vinylidene chloride polymers and copolymers. In addition to their ability to improve the flexibility and pliability of these compositions, they present the added advantage of contributing increased fire resistance and resistance to attack by fungi to the plasticized article because of their high chlorine content. Dibasic acids and esters thereof are especially valuable for the preparation of linear polyesters and/or as components of alkyd resins. Esters of these acids with unsaturated alcohols may be polymerized to produce products having excellent fungicidal and flame-resistant properties.

As indicated, the novel acids of the invention comprise the aromatic acids which have one ring carbon atom attached to a hexachlorobicycloheptenyl radical. The novel acids can be monocarboxylic or polycarboxylic and the aromatic nucleus can consist of a benzene, biphenyl or a naphthalene nucleus. The aromatic nucleus may be further substituted, if desired, with other substituents, including alkyl groups, particularly those alkyl groups which are relatively resistant to oxidation, such as a tertiary butyl group, nitro-groups, additional halogen atoms, especially chlorine atoms, which further increase the activity of the compounds in insecticidal and flame retardant properties, and the like.

The hexachlorobicycloheptenyl substituted aromatic acids of the present invention can be prepared by any suitable method. They are preferably prepared by condensing hexachlorocyclopentadiene with a mono- or polyalkyl substituted styrene or an alpha-alkyl, such as alphamethyl, styrene compound by the Diels-Alder reaction. The resultant condensate can then be oxidized preferably in the liquid phase and in the presence of metallic oxidation catalysts to convert one or more of the alkyl substituents on the aromatic nucleus to carboxylic acid functional groups. We prefer to conduct the oxidation in the presence of a lower carboxylic acid solvent and in the presence of a catalyst comprising in conjoint presence bromine and a heavy metal oxidation catalyst, especially where it is desired to convert more than one alkyl group on the aromatic ring to carboxylic acid groups.

Alternatively, hexachlorocyclopentadiene can be condensed with styrene or alpha-methyl styrene (or the corresponding ring-methyl derivatives thereof) and the Diels-Alder adduct subsequently alkylated to introduce additional alkyl groups on the aromatic ring. These alkylated products can, as hereinabove described, be smoothly oxidized to the aromatic mono- or polycarboxylic acids of the present invention.

Para-phenyl styrene or ethylene naphthalene, optionally additionally substituted with alkyl groups, may be substituted for the styrene in the foregoing reactions in the preparation of the biphenyl or naphthyl di-cyclic aromatic acids.

In preparing the novel compounds of our invention, hexachlorocyclopentadiene is first reacted with one of the above-mentioned ethylenephenyl or ethylene naphthyl-type feedstocks, or with ring alkylated derivatives of such feedstocks. The Diels-Alder adducts are conveniently formed by heating equimolar quantities of the hexachlorocyclopentadiene and the aromatic feedstock, but a molar excess of either component can be employed. Generally molar ratios in the range of 0.5 to 1.5 are preferred. The reaction is effected at temperatures of 50° C. to 200° C. and adduct formation is generally complete in 1 to 4 hours. The adduct can be conveniently recovered by fractional distillation at reduced pressure.

When desired, (or necessary as in the case of the hexachlorocyclopentadiene adducts non-substituted or alpha-substituted feedstocks), additional alkyl substituents are introduced into the aromatic ring by Friedel-Crafts alkylation of the Diels-Alder adduct. These alkylations are conveniently carried out at about 0–160° C., and atmospheric pressure, employing alkyl halides, preferably having from 1 to 3 carbon atoms, and aluminum chloride. The alkyl halides preferably have from 1 to 4 carbon atoms per alkyl group, such as methyl, isopropyl, n-butyl, and secondary butyl and tertiary butyl. It will be clear, however, that alkylation may be effected by conventional techniques known to the art, for example by reaction with equivalent alkylating agents including lower alcohols, olefins, ethers, acids, acid halides, and the like, and that alternative acid-reacting catalysts may be employed including $FeCl_3$, $SbCl_5$, $BF_3$, $ZnCl_2$, $HF$, $H_2SO_4$, $H_3PO_4$, $P_2O_5$, and the like.

In employing aluminum chloride as the alkylating agent, the above-described Diels-Alder adducts are preferably dissolved in a solvent and contacted with isopropyl chloride or equivalent alkylating agent in the presence of 0.025 to 1% by weight of aluminum chloride. Reaction periods of 1 to about 24 hours at ordinary temperature and pressure can be employed, and the alkylated product recovered by dilution with ice water and distillation of the organic layer. Alternative methods of working the desired reaction product will be apparent to those skilled in the art.

The hexachlorocyclopentadiene adducts prepared as above described and having one or more alkyl groups on the aromatic rings are converted to the aromatic acids of the present invention by liquid phase oxidation in the presence of heavy metal oxidation catalysts. While they may be oxidized in any convenient manner, for example, by the method described in U.S. Patent No. 2,245,528 of Loder, we prefer to effect the oxidation in a lower aliphatic carboxylic acid solvent and in the presence of a catalyst comprising in conjoint presence bromine and a heavy metal oxidation catalyst. Where desirable, the extent of oxidation can be controlled to effect conversion of only one of several oxidizable alkyl substituents on the aromatic ring to a carboxylic acid group. The use of bromine-heavy metal oxidation catalyst, as referred to in U.S. Patent No. 2,833,816, assigned to Mid-Century Corporation, permits the conversion in high yield of one or more such alkyl groups to carboxylic acid substituents.

Oxidation can be effected in lower aliphatic carboxylic acids as solvent including acetic acid, propionic acid, butyric acid and the like. Mixtures of acids can be employed. As metal oxidation catalyst, heavy metals especially those having atomic numbers from 23 to 29 are employed. Mixtures of metals can be used. Cobalt, manganese and mixtures thereof are especially effective. Surprisingly, we have found that the hexachlorobicycloheptene ring is remarkably stable to such oxidation procedures, and the only groups that are oxidized are the alkyl substtiuents on the aromatic ring.

The oxidation is conducted at atmospheric or superatmospheric pressure, generally at a pressure at least sufficient to maintain liquid phase reaction conditions. Preferably, temperatures of 100° C. to 250° C. are employed and pressure conveniently of 200–400 p.s.i. when acetic acid is the solvent. The metal catalyst is employed in amounts of 0.01 to about 1% based on the aromatic compound, preferably in the form of organic or inorganic salts. Bromine as the free element, or in the form of organic or inorganic compounds capable of supplying bromine ion to the reaction mixture, is employed in an amount between 0.1 and 10.0 gram atom per atom of metallic oxidation catalyst. The oxidizing gas may comprise air, pure oxygen, or mixtures of oxygen and inert gas.

The novel hexachlorobicycloheptenyl substituted aromatic acids of our invention have outstanding insecticidal as well as herbicidal and fungicidal properties and can be employed in insecticidal, fungicidal and herbicidal sprays and dust compositions. They may be employed alone or in combination with other known organic or inorganic insecticidal toxicants and as such may be applied in the form of solutions in organic solvents, as water-emulsions or dispersed on solid carriers such as diatomaceous earth, bentonite, talc and the like.

The acids of our invention are valuable for the preparation of alkyd type resins, as components of lubricating oil compositions, as anti-corrosion agents and the like. They are valuable intermediates for the production of many useful derivatives including the salts, esters, anhydrides, acid halides and amides. Heavy metal salts such as those of lead, iron, manganese and cobalt can be employed as fungi-resistant paint driers. Copper and mercury salts can be used as fungicides, as wood preserving agents or as lubricating oil additives. Other useful salts of these novel acids can be employed as stabilizers for polyvinyl chloride, as extreme pressure lubricants and as insecticides. The metal salts may be prepared directly from the free acids, for instance, by heating an oxide, hydroxide or carbonate of the metal with the acid, or by double decomposition of an alkali metal salt of an acid with a soluble salt of the desired metal.

Esters having many unusual and beneficial properties may be prepared from the novel acids of our invention by esterifying them with saturated mono- or dihydric alcohols, unsaturated alcohols, benzyl alcohols, or phenols, normally having not more than about 20 to 22 carbon atoms per molecule, although in some instances a higher number of carbon atoms may be desired. Particularly valuable are the esters of the mono- and dicarboxylic acids of the invention with lower saturated alkanols having from 2 to 12 carbon atoms in the molecule, e.g., ethanol, sec. butanol, n-octanol, isooctyl alcohol, decyl alcohol, lauryl alcohol, stearyl alcohol, and the like. These compounds have useful properties as plasticizers for synthetic resins such as vinyl halides, to which they impart valuable flame-proofing and fungi-resistant properties. Dimethylesters of the dibasic acids of our invention are worthy of mention as intermediates for the preparation of linear superpolyesters of the Dacron-type, and may be used as the sole diester component or in admixture with other aromatic dibasic acid diesters usually employed in the preparation of such linear superpolyesters by reaction with dihydric alcohols.

A wide variety of other useful ester derivatives of the novel acids of our invention can be prepared, including for example, esters of these acids with unsaturated alcohols such as allyl alcohol, which esters can be homo- or co-polymerized with vinyl compounds by means of peroxide-type catalysts. Other alkanols from which esters may be made are oleyl alcohol and linalyl alcohol.

Other illustrative alcohols are cyclohexanol, benzyl alcohol, salicyl alcohol, ethylene glycol, 1,4-butanediol and hexamethylene glycol.

Amides of the novel hexachlorobicycloheptenyl substituted aromatic acids are of value as insecticides, fungicides or herbicides, or as additives for compositions having insecticidal or fungicidal activity. The amides may be employed as components of resinous compositions, as plasticizers or lubricants. They may be prepared by methods known in the art, for example, by reaction of the acid halides or anhydrides described herein with primary or secondary alkyl, aryl, alkaryl or heterocyclic amines, such as ethyl amine, isopropyl amine, decyl amine, allyl amine, aniline, substituted anilines, and the like, usually having not more than about 20 or 22 carbon atoms, and preferably not more than 10 or 12 carbon atoms. Heterocyclic amines such as 2-aminopyridine, 2-aminothiazole, 4-aminoguinoline and 3-furylamine may also be used.

Further details of our invention are set forth in the following non-limitative examples, which are provided for the purpose of illustration only, and the invention is not to be regarded as limited to any of the specific conditions or reactants employed therein.

EXAMPLE 1

The Diels-Alder adduct of hexachlorocyclopentadiene and para-isopropyl-alpha-methylstyrene was prepared as follows: To a stirred 40 ml. sample (0.25 mole) of hexachlorocyclopentadiene was slowly added 40.2 g. (0.25 mole) of para-isopropyl-alpha-methylstyrene while the temperature was maintained at 125–130° C. After addition was complete the mixture was held at this temperature for 6 hours. Distillation of the reactor contents gave 41.7 g. (40% theory) of a pale yellow oil, boiling at 171–175° C. at 0.3 mm. Hg pressure and identified as 2-methyl-2-(4-isopropylphenyl) - hexachloronorbornene, having a molecular weight of 415±12. (Theory 432.)

A portion of the adduct so prepared (35 g.) was dissolved in 150 g. glacial acetic acid to which was added 0.2 g. cobalt acetate, 0.4 g. manganese acetate and 0.5 g. ammonium bromide dissolved in 6 ml. of water. The solution was charged to a tubular reactor and heated to 400° F. while air at 400 p.s.i. was passed through the solution by means of a sparger located below the liquid level. The reactor pressure was maintained by controlling the exit flow of gases. When oxygen absorption ceased (determined by analysis of the exit gases for oxygen) the reactor contents were cooled, removed by flushing with water and acetone, and diluted with a large volume of water. The solids which precipitated were dissolved in 10% aqueous caustic, and recovered by acidification with HCl. The acid was obtained in 68% yield. It had a melting point of 202–205° C., was difficultly soluble in aqueous 10% sodium hydroxide solution, and was identified as 2-methyl-2-(4-carboxyphenyl)-hexachloronorbornene. (Elemental analysis for $C_{15}H_{10}Cl_6O_2$.—Calculated: carbon, 41.47; hydrogen 2.29. Found: carbon 41.90; hydrogen 2.52.)

EXAMPLE 2

Similarly, 29.5 g. vinyltoluene was reacted with an equimolar quantity of hexachlorocyclopentadiene at 145° C. by dropwise addition of the styrene compound over a period of 2 hours. After heating for an additional hour at 140–145° C., the reaction mixture was distilled to give a quantitative yield of the adduct boiling at 180–185° C. at 0.8 mm. Hg pressure and consisting of a mixture of the isomers 2-(4-methylphenyl) and 2-(3-methylphenyl)-hexachloronorbornene. The refractive index of the adduct was $n_D^{25}$ 1.5857 and the molecular weight 391 (theory 390).

A 50 g. sample of this adduct was oxidized in accordance with the procedure of Example 1 to yield 70% of a monobasic acid, melting point 225–230° C. identified as 2-(carboxyphenyl)-hexachloronorbornene. Elemental analysis for $C_{14}H_{10}Cl_6O_2$.—Calculated: carbon, 40.0; hydrogen, 1.91. Found: carbon, 39.7; hydrogen, 2.1.

Para-tolyl styrene may be substituted for the vinyltoluene in order to obtain the 2-(carboxybiphenyl)-hexachloronorbornene, and a vinyl naphthalene substituted with one or more methyls at other than the alpha position may be used to prepare 2-(carboxynaphthyl)-hexachloronorbornene.

EXAMPLE 3

The example illustrates the preparation of an alkylated hexachlorobicycloheptenyl substituted benzene by alkylation of a previously prepared Diels-Alder adduct.

A mixture of 37.2 g. (0.1 mole) phenyl-hexachloronorbornene (adduct of hexachlorocyclopentadiene and styrene), 100 ml. of carbon tetrachloride, and 2 g. of aluminum chloride was stirred at about 5° C. while 22.4 g. (0.3 mole) of isopropyl chloride in 50 ml. carbon tetrachloride was added dropwise over a period of ¾ hour. The mixture was allowed to warm to room temperature and then stirred for an additional 16 hours. The reaction mixture was poured into ice water, the organic layer separated, and the aqueous layer extracted twice with carbon tetrachloride. The organic extracts were combined, dried and distilled giving a pale yellow oil boiling at 165–170° C., at 0.2 mm. Hg pressure and having a refractive index $n_D^{20}$ 1.5700. This oil solidified on standing to a solid having a melting point of 163–165° C. on recrystallization from methanol. This solid was identified as the monoisopropyl derivative of phenyl-hexachloronorbornene. The diisopropyl compound was isolated from the reaction mixture, and was oxidized to the corresponding dibasic acid following the procedure of Example 1. A yield of 70% of theory was obtained of dibasic acid isomers having an acid number of 242 and M.W. of 474±14. Theoretical acid number and molecular weight for such isomers are 241 and 464, respectively.

EXAMPLE 4

The alkylation of methylphenyl-hexachloronorbornene (Diels-Alder adduct of hexachlorocyclopentadiene and vinyltoluene) was effected in the following manner. A mixture of 507 g. (1.3 moles) of the hexachloronorbornene, 1000 ml. of carbon tetrachloride and 6 g. of aluminum chloride was stirred at room temperature while 203 g. (1.59 moles) isopropyl chloride in 200 ml. carbon tetrachloride was added. Addition was complete after 3–4 hours. The reaction mixture was stirred for 24 hours until HCl gas evolution ceased. The alkylate was diluted with ice water and the organic material recovered and distilled. The product was a pale yellow oil boiling at 175–180° at 0.3 mm. Hg pressure and having a refractive index of $n_D^{20}$ 1.5664. An 88% yield was obtained. Analysis of the distillate showed 47.18% C and 3.80 H compared to 47.22 C and 4.66 H calculated for the empirical formula $C_{17}H_{16}Cl_6$. Oxidation of the alkylate so obtained by the procedure of Example 1 gave 70% yield of a dibasic acid having a melting point of 226–230° C. and acid number of 240, identified as hexachlorobicycloheptenyl phthalic acid.

EXAMPLE 5

The ethyl ester of the monobasic acid of Example 2 was prepared by refluxing a mixture of 30 g. of the acid and 200 ml. ethanol in the presence of 2 ml. of concentrated sulfuric acid. After the reaction was complete, the mixture was distilled to produce ethyl hexachlorobicycloheptenyl benzoate, a viscous yellow oil having a boiling point of 200–201° C. (0.2 mm.). The ester was obtained in 90% yield.

This compound as a 5% solution in refined oil was tested as an insecticide and found to have toxic action against common houseflies.

Esters having related properties are obtained by replacing the ethanol in the above-described process with each of the following alcohols: methanol, n-butanol, n-octanol, isooctyl alcohol, nonyl alcohol and dodecanol.

EXAMPLE 6

The sodium salt of the acid of Example 2 was prepared by neutralization of a 10 gm. sample of the acid with 5% aqueous sodium hydroxide, the sodium salt being recovered by evaporating the solution to dryness. The salt was a white crystalline solid. The sodium salt was tested as an insecticide (5% solution in water) and found to have toxic action against common houseflies.

The copper salt of the acid of Example 2 was prepared as follows: a saturated aqueous solution of the sodium salt prepared as above was filtered and the filtrate added to a clear solution of copper sulfate in water. The copper salt which precipitated immediately was filtered off and dried. It was a light green crystalline solid. Compositions containing this salt have fungicidal activity.

EXAMPLE 7

The acid chloride of the acid of Example 2 was prepared by refluxing parts of the acid with an excess of thionyl chloride for several hours. The mixture so obtained was chilled and the precipitated acid chloride filtered on a Buchner funnel. The acid chloride obtained in high yield had a melting point of 85–90° C. It was pale yellow or tan in color. Additional quantities of the acid chloride could be recovered by distilling off excess thionyl chloride from the filtrate.

The acid chloride so obtained was treated with excess concentrated ammonium hydroxide to give the amide in essentially quantitative yield, having a melting point of 113–120° C. Elemental analysis of this compound showed 40.00% carbon and 2.32% hydrogen as compared to 40.09% carbon and 2.14% hydrogen calculated for $C_{14}H_9NOCl_6$.

An alternative method of preparing an amide is to react the amine with the acid halide, preferably the chloride, of an hexachlorobicycloheptenyl aromatic acid herein described in benzene or carbon tetrachloride. Still another method is to dissolve the acid and amine in water to yield the ammonium salt, evaporate the solution to dryness, and heat to about 100–200° C. for several hours.

The preparation of an acid halide using thionyl chloride, described above, is particularly suited to preparing the acid chlorides and bromides. An alternative is to react the hexachlorobicycloheptenyl acid with phosphorous or phosphoric chloride or bromide, to yield the corresponding acid halide and phosphorous or phosphoric acid. To prepare the acid fluoride, the acid may be reacted by heating with a simple fluoride such as KF or AgF. To prepare the iodide, reaction of the acid may be with NaI or $Cu_2I_2$.

EXAMPLE 8

The dicarboxylic acid of Example 4 was converted to the acid chloride by the procedure described in Example 7. The acid chloride so obtained was dissolved in 100 ml. benzene and added to a stirred solution of 3.7 gm. 1,6-hexanediamine and 3.0 gm. sodium hydroxide in 50 ml. water. The polyamide was recovered from the benzene layer by evaporation of the solvent on a steam bath. The product so obtained had a nitrogen content of 3.47% and chlorine content of 37.3%, and had a slightly milky color, just off water white. The polyamide did not support combustion in air, even after having been initially ignited in an open flame. Films prepared therefrom by casting from acetone solution adhere tightly to tin-plated steel, and may be used alone or compounded with known resinous materials for the preparation of tenacious, flame-resistant metal surface coatings. Structurally, the polyamide obtained from hexanediamine may be represented by:

EXAMPLE 9

The acid of Example 3 was tested as an extreme pressure additive by incorporation in solvent-extracted SAH 30 lubricating oil. A 2% solution of the acid in this oil carried a load of 24 pounds on the Almen machine, and failed at 26 pounds. In comparison, the base oil without the additive carried a load of 6 pounds but failed at 8 pounds.

It will, of course, be understood that the present invention is not limited to the particular methods of preparation or to the particular compounds hereinabove described. The specific procedures can, of course, be varied within the skill of the ordinary organic chemist. For example, various known techniques for carrying out Friedel-Crafts type alkylation reactions may be applied in the synthesis of the feedstocks employed in the preparation of the acids and derivatives thereof which constitute our invention. The oxidation of alkyl aromatic hexachloronorbornenes is not necessarily carried out with molecular oxygen-containing gas, as hereinabove illustrated, but may be conducted by means of known chemical oxidants such as chromic anhydride, potassium permanganate, nitric acid and the like according to methods known in the art to be applicable to the oxidation of alkyl substituents on an aromatic nucleus. Other methods for air oxidation, including the use of higher or lower temperatures, other metallic oxidation catalysts and vapor phase or non-solvent liquid phase oxidation conditions are equally applicable.

It is apparent that a wide variety of mono- and poly-carboxylic aromatic acids and their derivatives are provided by the present invention, and the invention is not to be limited in any way by the particular operating examples provided herein. The compositions of the present invention are generally useful as pesticides, herbicides, fungicides and insecticides, and can be employed as such either alone or together with insecticidal adjuvants known to the art. The novel compositions of our invention are valuable as ingredients of dyes and pigments, additives, (especially extreme pressure additives) for lubricating oils, as components of various resinous compositions, e.g., alkyd resins, polyester resins, polyamide resins, and the like, as anti-corrosion agents, viscosity index improvers and the like.

Useful salts of the acids of our invention include those of the alkali metals, such as sodium, potassium, rubidium, cesium; the alkaline earth metals, such as barium, calcium, magnesium, strontium; and polyvalent metals such as chromium, mercury, nickel, cobalt, manganese, tin, titanium, vanadium, zinc, cadmium, aluminum, zirconium, lead, molybdenum, iron, the precious metals, such as silver, platinum, or the like, including the am-

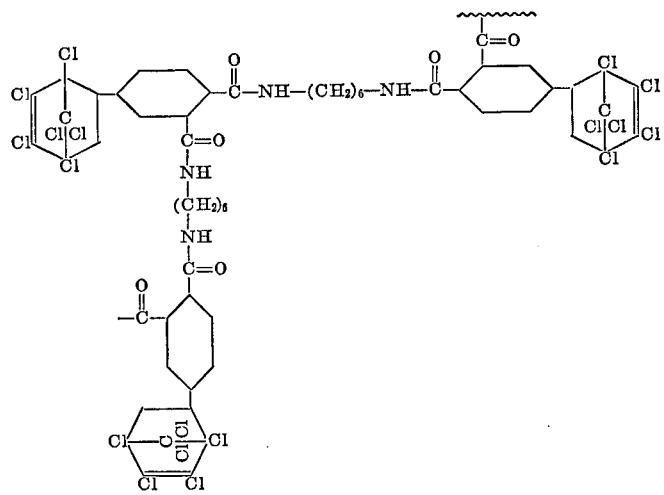

monium ion. Such salts may be variously employed as paint driers, as stabilizers for polyvinyl chloride, as additives for improving the load carrying capacity of lubricating oils, etc. Copper and mercury salts are particularly valuable as fungicides and wood-preserving agents.

The metal salts may take a number of forms. For instance, they may be in the form of mono-, di- or tri-alkali metal salts, or in the form of a di-valent (as the cupric or stannous) salt of two mono-carboxylic acids, or of one di-carboxylic acid where the carboxyl groups are in the ortho position, or in the form of:

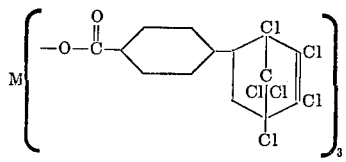

where M is a tri-valent metal ion, such as ferric, chromic or aluminum.

The intra-molecular and inter-molecular anhydrides of the acids may be made by dehydrating by heating, respectively, a di- or tri-carboxylic acid having carboxylic groups ortho to one another, or by heating together mono or other polycarboxylic acids.

It will be apparent that our invention provides a novel class of aromatic organic acids and their derivatives, including esters, salts, amides, polyamides, acid chlorides, anhydrides and the like, having wide utility in many fields of application.

It is to be understood that in the specification and the claims, the phrase "hexachlorobicycloheptenyl" refers to a radical having the structure:

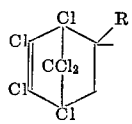

wherein R may be selected from the class consisting of hydrogen and low molecular weight alkyl radicals of less than about 5 carbon atoms per radical. The phrase "aromatic acids having less than 3 aromatic rings" refers to substituted and non-substituted benzene, biphenyl and naphthalene nuclei having at least one carboxyl

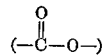

group attached to an aromatic ring carbon atom. The phrase "metal salts" also includes ammonium.

Having thus described the invention, we claim:

1. Film forming polycarbonamides of 1,6-hexane diamine and hexachlorobicycloheptenyl polycarboxylic carbocyclic aromatic acids having one or two carbocyclic aromatic rings and having one carbocyclic aromatic ring carbon atom joined to hexachlorobicycloheptenyl radical.

2. Film forming polycarbonamide of 1,6-hexane diamine and hexachlorobicycloheptenyl phthalic acid having one carbocyclic aromatic ring carbon atom joined to hexachlorobicycloheptenyl carbocyclic aromatic radical.

References Cited

UNITED STATES PATENTS

| | | | |
|---|---|---|---|
| 2,296,555 | 9/1942 | Hubert et al. | 260—78 |
| 3,081,281 | 3/1963 | Beghin | 260—78 |
| 3,194,794 | 7/1965 | Caldwell et al. | 260—78 |
| 3,361,801 | 1/1968 | Farah et al. | 260—78 |

WILLIAM H. SHORT, *Primary Examiner.*

H. D. ANDERSON, *Assistant Examiner.*

U.S. Cl. X.R.

260—32.8, 18, 45.85, 31.8; 167—30; 252—58, 32, 396